United States Patent [19]
Thompson et al.

[11] 3,912,854
[45] Oct. 14, 1975

[54] ENCAPSULATED CONDUCTOR JUNCTION

[76] Inventors: John T. Thompson, 244 Loring St., Los Angeles, Calif. 90053; George W. Gillemot, 2331 - 20th St., Santa Monica, Calif. 90406

[22] Filed: July 12, 1971

[21] Appl. No.: 161,562

Related U.S. Application Data

[60] Division of Ser. No. 884,874, Jan. 26, 1970, abandoned, which is a continuation-in-part of Ser. No. 797,943, Feb. 10, 1969, abandoned.

[52] U.S. Cl. .................. 174/88 C; 174/76; 174/87; 174/93
[51] Int. Cl.² ........................................ H02G 15/08
[58] Field of Search ............ 174/88 R, 88 C, 91–93, 174/21 R, 21 C, 87, 138 F; 339/205, 211, 213, 272 B

[56] References Cited
UNITED STATES PATENTS
3,614,295  10/1971  Gillemot et al. .................. 174/93 X FOREIGN PATENTS OR APPLICATIONS
177,138  11/1961  Norway ................................ 174/93

*Primary Examiner*—Darrell L. Clay
*Attorney, Agent, or Firm*—Harris, Kern, Wallen & Tinsley

[57] ABSTRACT

An encapsulated junction for a plurality of shielded conductors or cables wherein the shielding shrouds are held in firm electrical contact by non-wrenchable split bolt connector means. This assembly is further protected and safeguarded against loosening by a surrounding mass of solid potting compound.

9 Claims, 10 Drawing Figures

U.S. Patent    Oct. 14, 1975    Sheet 1 of 2    3,912,854
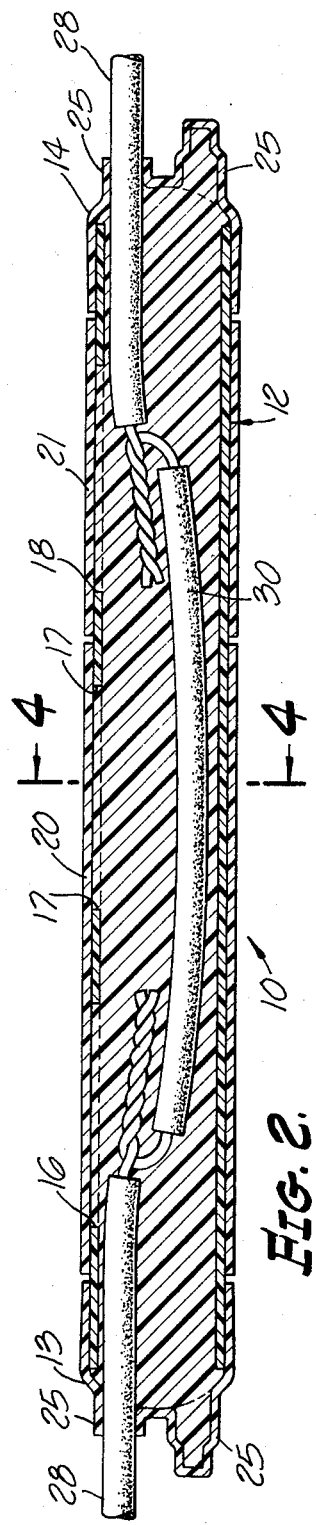
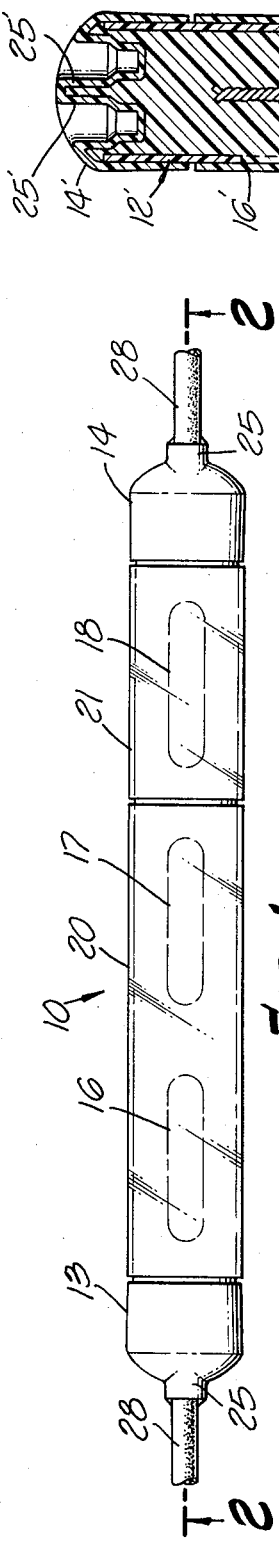
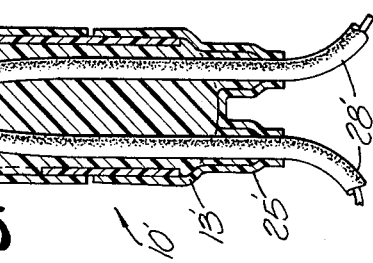
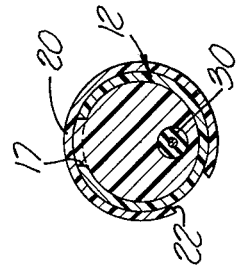
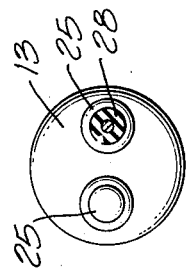
INVENTORS.
GEORGE W. GILLEMOT
JOHN T. THOMPSON
BY
ATTORNEYS

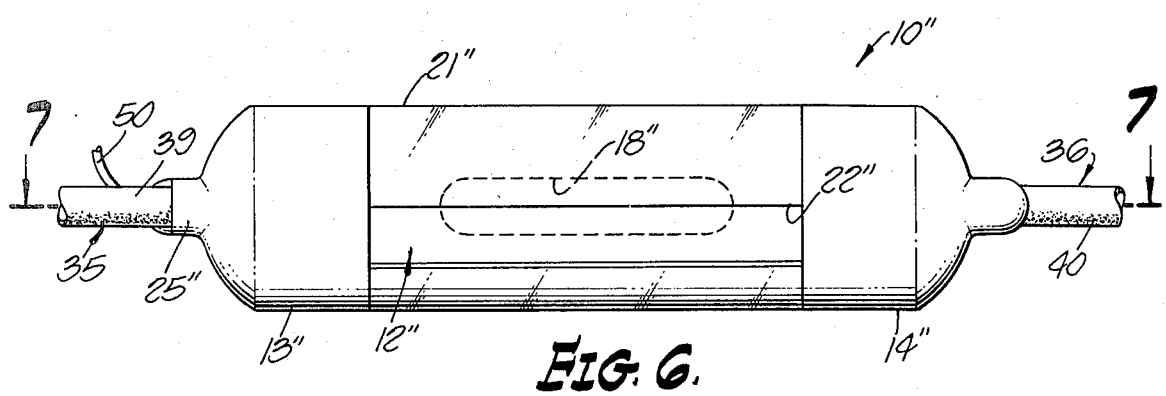
FIG. 6.
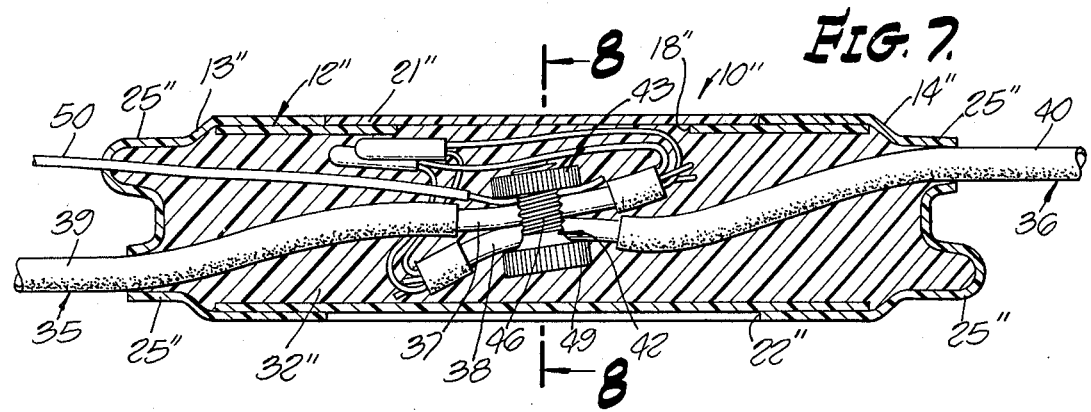
FIG. 7.
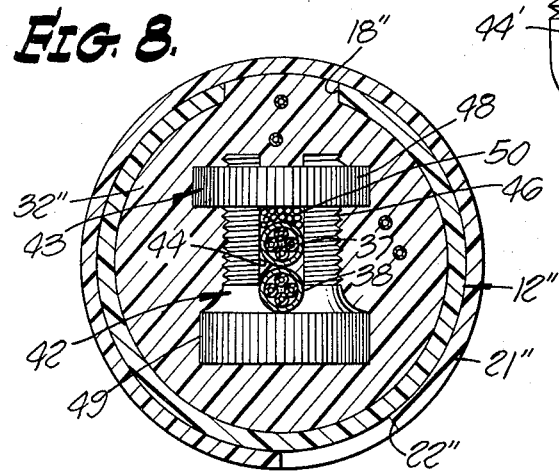
FIG. 8.
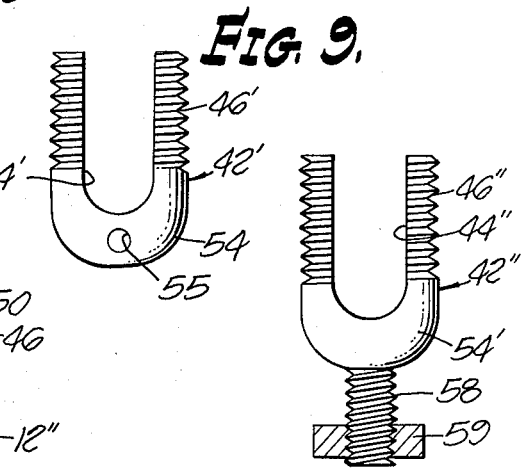
FIG. 9.
FIG. 10.
INVENTORS
GEORGE W. GILLEMOT
JOHN T. THOMPSON
BY
ATTORNEYS

ENCAPSULATED CONDUCTOR JUNCTION

This application is a division of our copending application for U.S. Pat. Ser. No. 884,874 filed Jan. 26, 1970, now abandoned, which application is a continuation in part of our application Ser. No. 797,943 filed Feb. 10, 1969, now abandoned.

This invention relates to electrical junction assemblies and more particularly to a unique encapsulating assembly of rugged, lightweight, inexpensive construction easily assembled over a splice junction and charged with a non-conductive potting compound.

Many proposals have been made heretofore for providing an electrical junction with a protective enclosure but such proposals are subject to numerous disadvantages and shortcomings avoided by the present invention. The problem involves provision of easily assembled components capable of being fitted together about an electrical junction to provide an insulated weatherproof enclosure for the junction. Prior constructions are characterized by their complexity and excessive number of costly components which are time-consuming to assemble about a junction. Many of these prior expedients are lacking in versatility to accommodate a range of wire sizes and for use under the widely differing, commonly encountered operating conditions. By way of example, reference is had to the common experience of having to repair an underground utility service connection between the main line and a service outlet after this service connection has been severed accidentally by workmen doing excavation or the like work. Repair of the broken connection without uncovering long lengths of the service connection requires splicing in a short length of connector cabling. Thereafter, this longer-than-normal splice must be suitably enclosed and sealed against moisture, stray currents, or risk of galvanic or electrolytic action.

Conductors of the type enclosed by the invention splice assembly customarily include an electrical shielding shroud serving as a barrier against the passage of flux fields. To be effective such as a shield must be continuous and suitably grounded. If aluminum foil is employed for the shield, as it commonly is, there is a problem in completing a good electrical connection between the shielding shrouds of the several conductors owing to the thinness and very low strength of the foil.

It is, therefore, a primary purpose of the present invention to provide a simple, rugged, inexpensive encapsulating assembly which is highly versatile and adaptable to widely varying conditions and operating environments and by the use of which electrical splices and junctions can be protected indefinitely from the elements. These objectives are achieved using several novel expedients including a simple non-wrenchable connector to anchor the electrical shielding layers together and, if desirable, to a grounding wire. Another important feature is the provision of a splice assembly enclosure comprising a length of high-durability plastic tubing capable of withstanding shock, abusive handling, and adverse atmospheric conditions likely to be encountered in normal use. A single valved opening for potting compound suffices for shorter embodiments of the tubular shroud, whereas two or more such openings are desirable in shrouds for longer splices. The potting compound completely surrounds the shielding connector and positively locks its mated threads against loosening from vibration, temperature changes and other adverse factors.

Accordingly, it is a primary object of the present invention to provide a simple, inexpensive, lightweight, substantially indestructible assembly for use in encapsulating conductor and cable splices of a wide range of types and sizes.

Another object of the invention is the provision of unique non-wrenchable connector for use in providing a strong and durable electrical connection between the shielding shrouds of cables at a splice junction.

Another object of the invention is the provision of a vibration proof permanent mechanical connection between the electrical shielding shrouds between a plurality of cables and utilizing an encapsulating body of potting compound to secure the parts of the mechanical connection against loosening.

Another object of the invention is the provision of a non-wrenchable mechanical connector for electrically interconnecting cable shielding shrouds and for anchoring grounding wires thereto without need for tools and without risk of rupturing or damaging the shielding shroud.

These and other more specific objects will appear upon reading the following specification and claims and upon considering in connection therewith the attached drawings to which they relate.

Referring now to the drawings in which preferred embodiments of the invention are illustrated:

FIG. 1 is a side view of one illustrative embodiment of the invention fully assembled and sealed;

FIG. 2 is a cross-sectional view on an enlarged scale taken along line 2—2 on FIG. 1;

FIG. 3 is a cross-sectional view of FIG. 2 from one end thereof;

FIG. 4 is a cross-sectional view taken along line 4—4 on FIG. 2;

FIG. 5 is a cross-sectional view through a second preferred embodiment of the invention in assembled condition;

FIG. 6 is a side view of a second preferred embodiment of the invention fully assembled;

FIG. 7 is a longitudinal sectional view taken along line 7—7 on FIG. 6;

FIG. 8 is a cross-sectional view on an enlarged scale taken along line 8—8 on FIG. 7;

FIG. 9 is a side view of a second embodiment of the shank component of the invention non-wrenchable connector; and FIG. 10 is a side view of another embodiment of the non-wrenchable connector.

Referring initially more particularly to FIGS. 1 to 4, there is shown an exemplary embodiment of the invention encapsulating assembly, designated generally 10, having a plastic main body tube 12 open at either end and normally closed by snug-fitting plastic caps 13,14. Tube 12 is preferably made of transparent, tough, and highly durable plastic composition, the transparency enabling workmen to check the position of the splice during the final assembly operation, and in particular, to note whether there is any trapped air present during the final stages of the potting operation.

A polycarbonate thermoplastic composition is particularly suitable because of its many advantageous properties under the environmental conditions encountered in the use of the invention assembly. Among these desirable properties is its high impact and dielectric strength, excellent heat resistance and stability and outstanding ability to form a permanent high strength bond with epoxy and other commonly used potting compounds. In longer versions of the encapsulating assembly, as shown in FIGS. 1 and 2, it is desirable to provide main body tube 12 with two or more charging slots 16,17,18, the number depending on the length of the tube required to enclose the splice. These slots are preferably elongated lengthwise of the main body and equipped with a valve movable between open and closed position relative to an associated charging opening.

A preferred valve construction comprises one or more split plastic sleeves, such as those indicated at 20 and 21 in FIGS. 1, 2 and 4. As there shown, sleeve 20 is sufficiently long to provide a common closure for both of the charging openings 16 and 17. Valve 21, on the other hand, controls only the single charging slot 18. Each of the valve sleeves 20,21 is constructed similarly from the same transparent plastic material as tube 12 and having a snug sliding fit over the exterior of the latter. A narrow strip of each sleeve is removed throughout its length as is indicated at 22 in FIG. 4, the portion removed having a width at least as great as the width of the charging slot. Accordingly, when the valve sleeve is in open position, the gap overlies an associated one of the charging slots so that the latter is unobstructed.

End caps 13,14 for the main shroud tube are generally cup-shaped and molded from semi-rigid slightly resilient and pliant plastic material. The interior dimensions of these caps are selected to have a snug or press fit with the exterior of tube 12. The bottom portion of the end caps is provided with at least one and preferably a plurality of stepped or tapering tubular extensions 25 closed at their smaller diameter ends. As herein shown, the tubular extensions 25 are stepped to provide at least two generally cylindrical portions of different diameters to accommodate wire or cabling of different sizes. Preferably the plastic material has limited resiliency and capability of stretching to have a snug fit with a slightly larger conductor. Alternatively, tubular extensions 25 may be of frusto-conical configuration. In all configurations, it will be understood that any portion of the extension may be severed at an appropriate point along its length depending upon the size of the conductor to be accommodated.

A typical use of the invention encapsulating assembly cited by way of illustration only is to repair a severed utility service cable at a point between the main line and the premises being serviced. In such cases, there customarily is no excess cable for use in making the splice and it is necessary to splice in a short length of conductor between the severed ends of service conductor 28. The workman removes a portion of the insulation of each end of service cable 28 and cuts off an appropriate length of the extension 25 of each end cap and inserts one end cap over each of the conductor ends. One end cap is pushed backwardly along the conductor for a distance adequate to accommodate tube 12 which is then threaded over the conductor. A short length of splice conductor 30 is prepared and its opposite ends are spliced to the cleaned ends of the service conductor 28. After these splices have been soldered, the parts of the encapsulating assembly 10 are shifted toward one another until tube 12 is centered over the splice area. At this time, end caps 13 and 14 are snugly seated over the opposite ends of the tube which is now ready for the hermetic sealing operation.

The sealing operation is carried out with charging openings 16,17,18 face upwardly and valve sleeves 26,21 in open position. Usually, the end provided with charging openings 16,17 is filled first. Valve 20 is rotated until in its fully open position with gap 22 registering with openings 16,17. A suitable potting compound 32, such as epoxy or any suitable high-dielectric, high-strength potting compound is charged into the shroud tube through openings 16,17 care being taken not to fill the tube too rapidly to allow air to escape without risk of forming any trapped air bubbles. The assembly is easily checked for the presence of such bubbles owing to the transparent material used for tube 12 and valve sleeves 20,21. It is preferable to overcharge the assembly leaving a small amount of surplus epoxy filling gap 22 of the split sleeve valves 20,21 thereby assuring that no voids have been left uncharged. This having been accomplished, the sleeves are rotated wiping away the surplus across the opposite edges of the charging slot and assuring that the potting material will be in contact with and bond to the interior surfaces of the sleeve valves bridging the charging openings. The potting compound, upon taking a set, forms a strong bond with the contacting surfaces of the end caps, tube 12, and any portions of the sleeve valves in contact with the compound. This adhesive bond, in cooperation with the housing proper, provides a permanent hermetically sealed enclosure for the splice with all parts firmly and permanently locked together in a fluid-tight condition.

Referring now to FIG. 5, there is shown a modified embodiment of the splice shroud assembly, designated 10', having the same general features described above in connection with FIGS. 1 to 4. The same or similar parts are designated by the same reference characters distinguished by the addition of a prime. The principal difference resides in the fact that the shorter encapsulating assembly has but a single valved opening 16' and a modified end cap 14'. Thus, in one of the end caps of the FIG. 5 construction, tubular extensions 25' project inwardly towards the center of tube 12' rather than outwardly, as they do in FIGS. 1 and 2. This has the decided advantage that the interior of the extension serves as a pilot to guide the conductor into and through its snug fitting smaller end. Additionally, the extension is embedded in and protected by the potting compound and includes a narrow annular space surrounding the conductor serving to provide stress relief for the conductor.

The FIG. 5 embodiment has but a single valve charging slot in view of the small size of the assembly. This valve is constructed similarly to that described above in connection with FIG. 2. This figure also shows a common mode of employing the splice where there is sufficient conductor material to splice the conductor ends to one another. This permits the assembly to be supported vertically with the conductors entering the lower end and the sealed end uppermost, as shown in FIG. 5 and providing even greater assurance against possible leakage of moisture into the interior.

In the case of the FIG. 5 assembly, the conductors are prepared and then inserted through the severed ends of extension 25'. In this connection, it will be understood that the user may employ either the type of extension shown on end cap 13' or the inturned type shown on end cap 14'. After the splice has been completed and soldered, the user assembles the tube 12' and end cap 14' downwardly into end cap 13' and then employs the sleeve valve 20', as previously described, in charging the assembly with compound 32' and completing the hermetic sealing operation.

Referring to FIGS. 6–8, there is shown a further embodiment of the invention splice encapsulating assembly, designated generally 10'', and wherein the same or similar components are designated by the same reference characters as in FIGS. 1–5, but distinguished therefrom by the addition of a double prime. This assembly differs essentially from that described above in that it encloses the splice between a pair of cables 35,36 each enclosing a plurality of pairs of insulated conductors embraced by a common shroud of electrical shielding, such as metal foil 37,38, and a conventional sheath 39,40. The two shielding layers 37,38 are held in firm electrical contact with one another by a split bolt metal connector having unique features to be described in detail below.

The invention non-wrenchable split bolt connector comprises a split bolt 42 and a radially narrow ring nut 43. The threaded shank 42 is provided with a deep but narrow slot 44 having a width snugly receiving the electrical shields 37,38 of cables 35,36 after a short length of sheath 39 and 40 has been removed from each of the cables. The inner end of slot 44 is semi-circular and seats directly against the similarly contoured surface of the electrical shields. The exterior of shank 42 is provided with threads 46 mating with the threads of ring nut 43. The exterior of this nut is circular but roughened as by shallow axial grooves 48.

The closed end of split bolt 42 is provided with an annular flange 49 and this likewise may be roughened by axial grooves similar to grooves 48 on the nut ring. These grooves enable the operator to obtain a firm finger grip with both the nut and the flanged end of the split bolt while grasping these components between the thumb and forefinger to tighten the parts. Since both the nut ring and the end of the split bolt are circular they cannot be engaged by a wrench and tightened excessively and so as to cause damage to the thin foil shielding 37,38. Overtightening is very difficult to avoid if a wrench is used owing to the thinness and low strength of the shielding foil or braid.

As shown in FIGS. 7 and 8, the non-wrenchable connector can also be employed to secure a grounding wire 50 to the shielding layers 37,38. This grounding wire extends to any conventional source of ground potential and desirably includes a plurality of annealed wires twisted together and are inserted against one of the shielding layers, as 37, in an area underlying the inner face end of nut ring 43. Tightening of the parts then compresses the shielding layers compactly together and in firm contact with the wires of grounding conductor 50. A surprising amount of pressure is applied between the contacting metal surfaces of the foil connector parts and the grounding wire using only finger strength to tighten the connector.

The splice assembly described above is prepared by removing an appropriate length of a nipple 25'' on end cap and inserting the shielded conductors 35,36 therethrough. One of the end caps is detached from tube 12'' during the assembly operation to provide adequate room for completing the splice connections and securing the split bolt connector in place about the cable shields. FIG. 7 shows a pair of conductors from each of the cables exposed and spliced together in any conventional manner. The other pair of conductors may be similarly spliced together or may be retained in reserve for future use if needed and left embedded in the potting compound.

The foregoing assembly operations having been completed, the detached one of the end caps is reassembled over the end of tube 12'' and the spliced junctions are centered in the splice housing and generally in axial alignment with one another as shown in FIG. 7. Thereafter the interior of the housing assembly is charged with potting compound 32'' in the same manner described in connection with FIGS. 1–5 and while opening 22'' of sleeve valve 21'' is in registry with charging opening 18''. Thereafter the sleeve is rotated out of registry with opening 18'' and compound 32'' is allowed to take a set. Not only are all interior parts and surfaces strongly bonded to the potting compound, but the two parts 42,43 of the connector assembly are locked immovably together as tightened by finger pressure. Accordingly and owing to the potting compound, it is impossible for these parts to become loose in any degree despite severe temperature changes, shock, severe vibration or other adverse conditions.

Referring to FIG. 9, there is shown a second preferred embodiment of the non-wrenchable electrical connector. In this embodiment only the split bolt proper 42' is illustrated, it being understood that the ring nut usable with this shank may be identical with that illustrated at 43 in FIGS. 7 and 8. Threaded shank 42' differs in that in lieu of the roughened annular head portion 49 the closed end of the shank is formed with a generally semi-circular smooth surface 54. The shank is formed of ductile metal of good electrical conductivity and head portion 54 is provided with an opening 55 sized to snugly receive a grounding wire such as wire 50. This wire may be locked in assembled position by using a prick punch or other suitable tool to upset the rim edge of opening 55 after the ground wire has been inserted therein.

The FIG. 9 connector is particularly suited for use in smaller sizes, it being found that a large roughened head such as that shown at 49 in FIG. 8 may be dispensed with since the user can grasp the opposite lateral sides of the overlapped ends of the cable in one hand while grasping the nut ring between the thumb and forefinger of his other hand while performing the tightening operation.

A third embodiment of the split bolt connector is illustrated in FIG. 10 and differs from that just described primarily in the provision of a threaded stud 58 projecting from the center of the rounded end portion 54'. A clamping nut 59 is threaded over shank 58 and used to clamp a grounding wire to the split bolt. This nut, along with a thumb nut corresponding to nut 43, are held tightened in the assembled condition of the connector by embedding the same in potting compound held in place about the connector in any suitable manner.

It will be understood that the invention connector may be used in a wide variety of operating environments other than those described hereinabove. The connector need not be embedded in potting compound in applications not subject to wide temperature changes, shock or vibration or other conditions likely to cause loosening of the parts. It will also be understood that the threaded stud 58 in FIG. 10 may be replaced by a threaded bore formed in the rounded end portion 54' of the connector shank. In this case, a short threaded screw may be used to hold the grounding wire clamped to the end of the split bolt.

While the particular encapsulated conductor junction herein shown and disclosed in detail is fully capable of attaining the objects and providing the advantages hereinbefore stated, it is to be understood that it is merely illustrative of the presently preferred embodiments of the invention and that no limitations are intended to the detail of construction or design herein shown other than as defined in the appended claims.

We claim:

1. A conductor junction utilizing a non-wrenchable split bolt electrical connector electrically interconnecting the metallic shielding shrouds of a plurality of conductors comprising: a pair of mated threaded parts each lacking wrench engaging surfaces and including a threaded ring and a shank, said shank being threaded and having a deep slot axially thereof and opening through its threaded end, said slot receiving and firmly seating the shielded shrouds of a plurality of conductors between the inner end of said slot and the adjacent inner face of said threaded ring, the periphery of said threaded ring being roughened to facilitate gripping the same between the user's thumb and forefinger to tighten the same to the extent possible by an operator's finger and without risk of damage to said shielding shrouds, said threaded ring being tightened on said threaded shank gripping the shielding shrouds between the inner end of said slot and the adjacent face of said threaded ring, and said tightened threaded parts and the adjacent portions of said sheathed conductors being embedded in solidified potting compound effective to isolate said threaded parts from contact with conductive objects and effective to lock said threaded parts against loosening despite vibration and temperature changes.

2. A conductor junction as defined in claim 1 characterized in the provision of a protective housing surrounding said potting compound and including openings through the wall thereof through which said shielded conductors extend and within which said conductors are sealed by said potting compound.

3. A conductor junction as defined in claim 2 characterized in that said protective housing includes a tubular main body having an opening through the sidewall thereof to receive said potting compound therethrough, and sleeve means having a loose fit about said tubular housing and having an opening rotatable into and out of alignment with said first mentioned opening, said housing being charged with said potting compound and the opening of said sleeve means being rotatable out of registry with said opening through said tubular body with said potting compound sealing said sleeve means closed and against rotation.

4. A conductor junction as defined in claim 1 characterized in that a grounding conductor for the shielding shrouds of said conductors is clamped in electrical conducting contact with a surface of said split bolt connector and has the adjacent portion thereof bonded to said potting compound thereby safeguarding the same against disruption of its electrical contact with said split bolt connector.

5. An encapsulated splice assembly comprising a tubular housing enclosing a splice junction between the ends of a pair of shielded cables projecting from the ends of said tubular housing, the overlapped ends of the shields of said cables being clamped in firm electrical contact with one another by non-wrenchable split bolt connector means having mated threaded parts tightened against said overlapped shielded cable ends solely by finger power, and the major portion of said housing being charged with potting compound to a level above said splice and embedding said connector means to lock the parts thereof positively against loosening.

6. An encapsulated splice assembly as defined in claim 5 characterized in that said tubular housing includes separate end caps having a snug fit with the opposite ends thereof and including nipples integral therewith and closed at one end, the ends of certain of said nipples being severed and snugly embracing a respective one of said shielded cables at its point of entry into said housing, and said potting compound being effective to seal said housing and said cables to said end caps.

7. That method of making a shake-proof electrical grounding connection with the conductive shielding shroud of cabling which comprises: removing a length of the insulative sheath of cabling to expose a short length of the underlying conductive shielding shroud, inserting the exposed shroud crosswise of the threaded shank of a non-wrenchable split bolt connector, clamping the exposed end of a grounding conductor against said shielding shroud, tightening the connector nut solely by finger pressure to clamp said cabling and conductor tightly in said connector and in electrical conducting contact, and encapsulating said connector and the adjacent portions of said grounding conductor and cabling in initially fluent but settable potting compound to isolate said connector from contact with foreign bodies and to lock said split bolt connector against loosening.

8. That method defined in claim 7 characterized by the step of overlapping and clamping together the exposed shielding shrouds of a plurality of cabling ends by said split bolt connector before encapsulating the same in said potting compound.

9. That method defined in claim 8 characterized in the step of substantially enclosing the clamped ends of said cabling and said grounding conductor with a protective casing and then filling the latter with said initially fluent but settable potting compound.

* * * * *

UNITED STATES PATENT AND TRADEMARK OFFICE
CERTIFICATE OF CORRECTION

PATENT NO. : 3,912,854
DATED : October 14, 1975
INVENTOR(S) : John T. Thompson and George W. Gillemot It is certified that error appears in the above—identified patent and that said Letters Patent are hereby corrected as shown below:

Column 1, line 40, "...such as a shield .." should be --...such a shield ...--

Column 5, line 61, "...nipple 25" on end..." should be --...nipple 25" on each end...--

Signed and Sealed this thirteenth Day of April 1976

[SEAL]

Attest:

RUTH C. MASON
Attesting Officer

C. MARSHALL DANN
Commissioner of Patents and Trademarks